United States Patent [19]
Aeschbach

[11] Patent Number: 5,788,620
[45] Date of Patent: Aug. 4, 1998

[54] APPARATUS AND METHOD FOR PRODUCING BAGS

[75] Inventor: Rudolph Aeschbach, Wohlen, Switzerland

[73] Assignee: Cellpack Ag, Switzerland

[21] Appl. No.: 581,587

[22] PCT Filed: May 17, 1995

[86] PCT No.: PCT/CH95/00110

§ 371 Date: May 28, 1996

§ 102(e) Date: May 28, 1996

[87] PCT Pub. No.: WO95/31329

PCT Pub. Date: Nov. 23, 1995

[30] Foreign Application Priority Data

May 17, 1994 [CH] Switzerland ............... 1544/94

[51] Int. Cl.[6] ............................................. B31B 1/84
[52] U.S. Cl. ............................................. 493/212
[58] Field of Search .................... 493/212, 213, 493/223, 224, 929, 211, 338, 339

[56] References Cited

U.S. PATENT DOCUMENTS

| | | | |
|---|---|---|---|
| 4,294,574 | 10/1981 | Bayham | 493/213 |
| 4,352,669 | 10/1982 | Norton | 493/213 |
| 4,568,321 | 2/1986 | Gaubert | 493/213 |
| 5,273,514 | 12/1993 | Kristensen | 493/224 |
| 5,312,189 | 5/1994 | Aeschbach et al. | |

FOREIGN PATENT DOCUMENTS

| | | |
|---|---|---|
| 0 299 562 A1 | 1/1989 | European Pat. Off. |
| 0 340 233 B1 | 11/1989 | European Pat. Off. |
| 0 515 896 A1 | 12/1992 | European Pat. Off. |

*Primary Examiner*—Jack W. Lavinder
*Attorney, Agent, or Firm*—Olson & Hierl, Ltd.

[57] ABSTRACT

The apparatus for producing bags comprises three processing areas (4–6), wherein two foil webs (1, 2) are lying on top of each other in the first processing area (4), are guided separately in a second processing area (5) and again lie on top of each other in a third processing area (6). In the second processing area (5) a spout, e.g. having the shape of a tube, is inserted between the foils and welded to both foils in the third processing area (6). In the first processing area the foils can e.g. be pre-formed or pre-cut. By separating the foil path into these three different processing areas, it becomes possible that the two adjacent foils are pre-processed in the first processing area while there is enough space for introduction of the spout in the second processing area.

17 Claims, 6 Drawing Sheets

FIG. 3
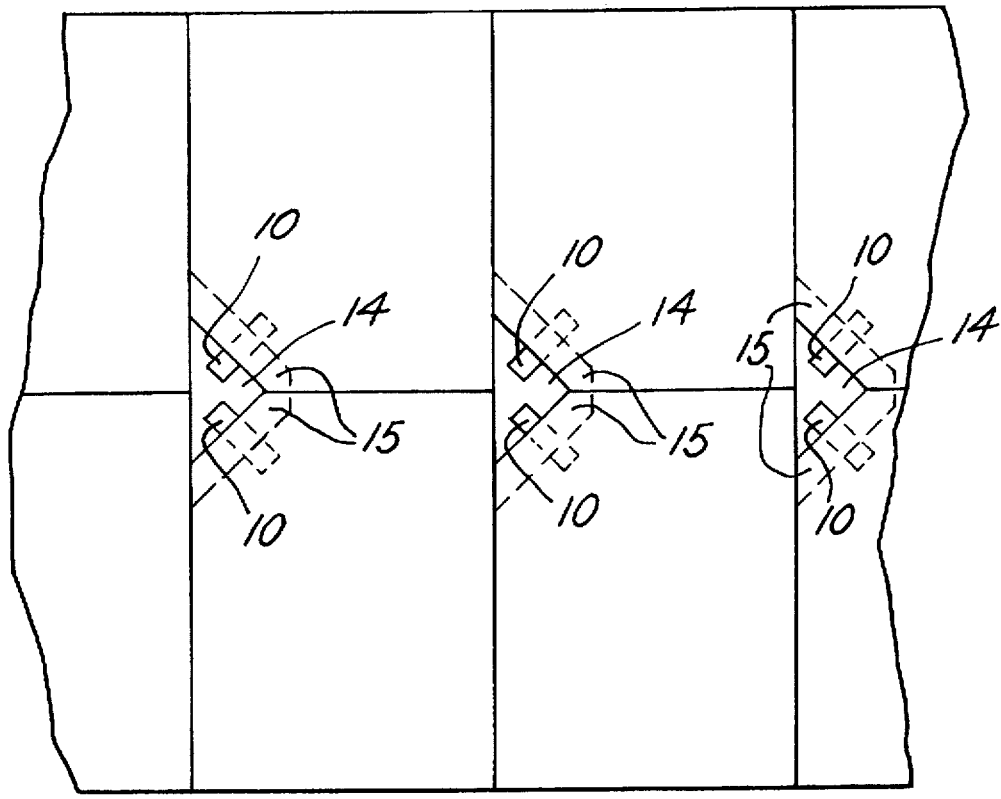
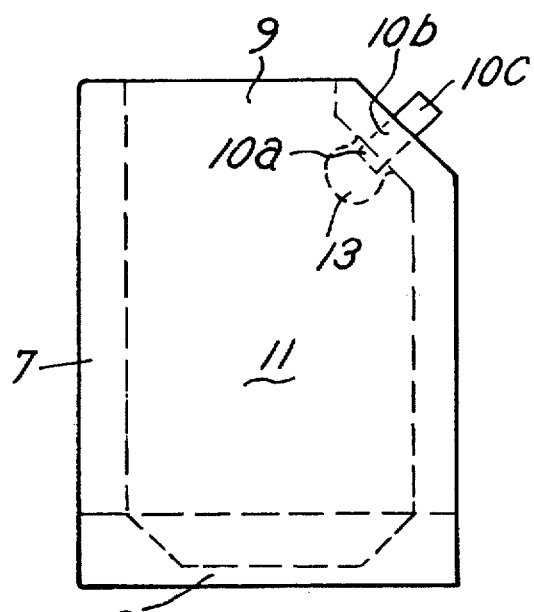
FIG. 4
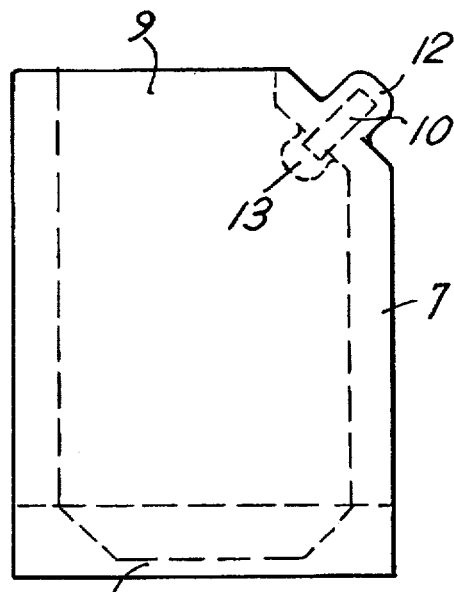
FIG. 5

APPARATUS AND METHOD FOR PRODUCING BAGS

The invention relates to a method and an apparatus for producing bags according to the claims 1 and 12, respectively, as well as to an insertion device and a pre-former for said apparatus according to claims 31 and 32.

A bag of the kind that can be produced with the present invention is e.g. described in EP-A-515 896. The bag shown there is a standing bag, the side walls of which are made from at least two foil webs, which are connected to each other in edge regions. For emptying the contents, a spout is provided, which is welded into the edge region of the bag as a tube like organ.

The production of such bags is not easy. Especially the insertion of the spout when using two or more webs for bag production offers problems. EP-A-299 562 e.g. describes a production method where the spout is inserted into the bag from a bottom side after the bag's side walls have already been partially connected. Here, the spout must cover a comparatively long way through the bag's interior and it must be guided carefully. This slows production down and makes it complicated. Furthermore, the spout cannot be mounted in an arbitrary position.

On the other hand it can be imagined to introduce the spout before connecting the side foils. In this case, certain processing steps required to prepare the receipt of the spout must be carried out on the separated foil webs. This is comparatively complicated because each foil web must be worked separately. Furthermore, it is thereafter not easy to position the individually prepared foil webs sufficiently accurately on top of each other.

Therefore, it is a object of the invention, to offer a method of production and an apparatus of the kind mentioned initially, which avoid these disadvantages as far as possible.

This object is met by the invention defined in the independent claims.

By using a foil path where the foil webs first lie on top of each other, then run separately, and then again are guided on top of each other, which seems somewhat complicated at first sight, it becomes possible to introduce the duct means comfortably and easily in the second processing area. On the other hand, all necessary preparation steps can be carried out in the first processing area simultaneously on both foil webs together.

If possible, it is thereby preferred to arrange the complete insertion device between the foil webs, such that the path from the insertion device to the foil web is short and insertion can be carried out very quickly.

During insertion the duct means is preferably positioned using a suitable positioning means and attached to one of the foil webs, such that it maintains its position.

If the foil webs are pre-cut in the first processing area, it becomes possible to arrange the duct means such that it extends outwardly over the outer edge.

If depressions are to be formed in the foil webs, they are preferably prepared by means of a preformer where pre-heated areas of the foil are subjected to pressure. It should preferably be possible to regulate pressure individually for at least part of the depressions. In this way a well-defined forming of the foil is possible even if the foil has anisotropic and inhomogeneous stretching properties.

Further embodiments, advantages and applications of the invention are given in the now following description of an inventive apparatus. Such description makes reference to the figures, wherein:

FIG. 3 shows the formed foil webs upon leaving the apparatus of FIG. 1.

FIG. 4 is a completed bag.

FIG. 5 is a second embodiment of a completed bag.

Figure 1:
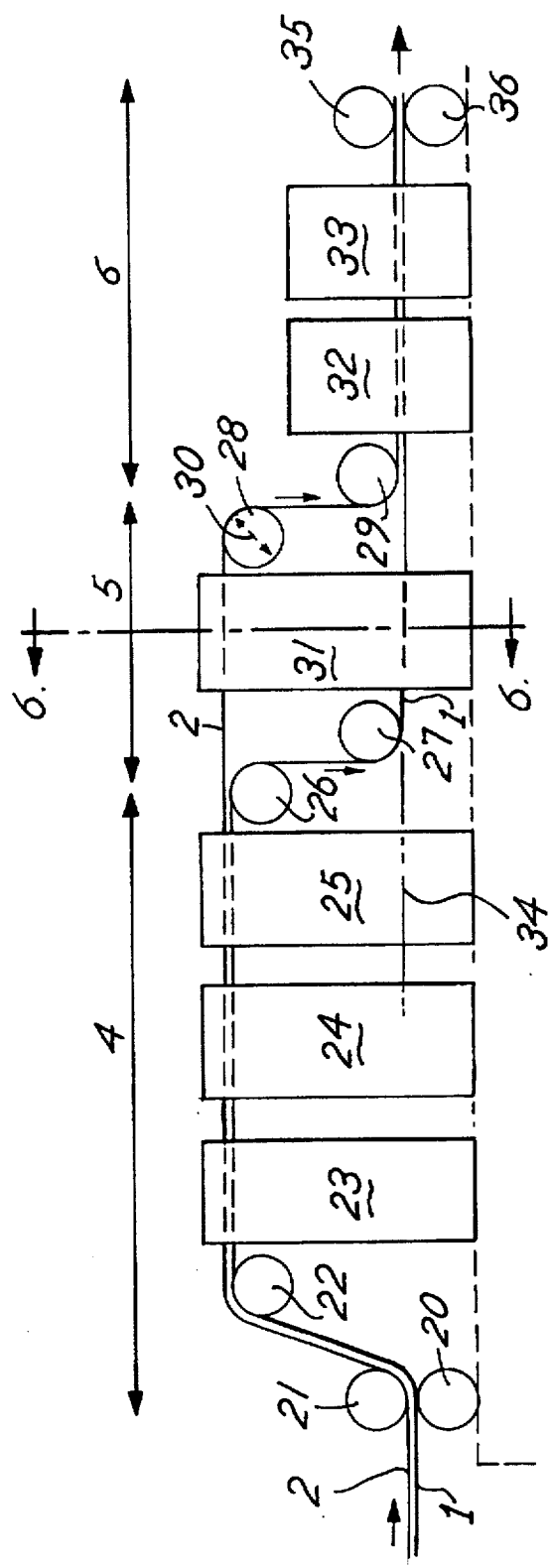
FIG. 1 is a schematic side view of the apparatus for making bags according to the present invention.
Figure 2:
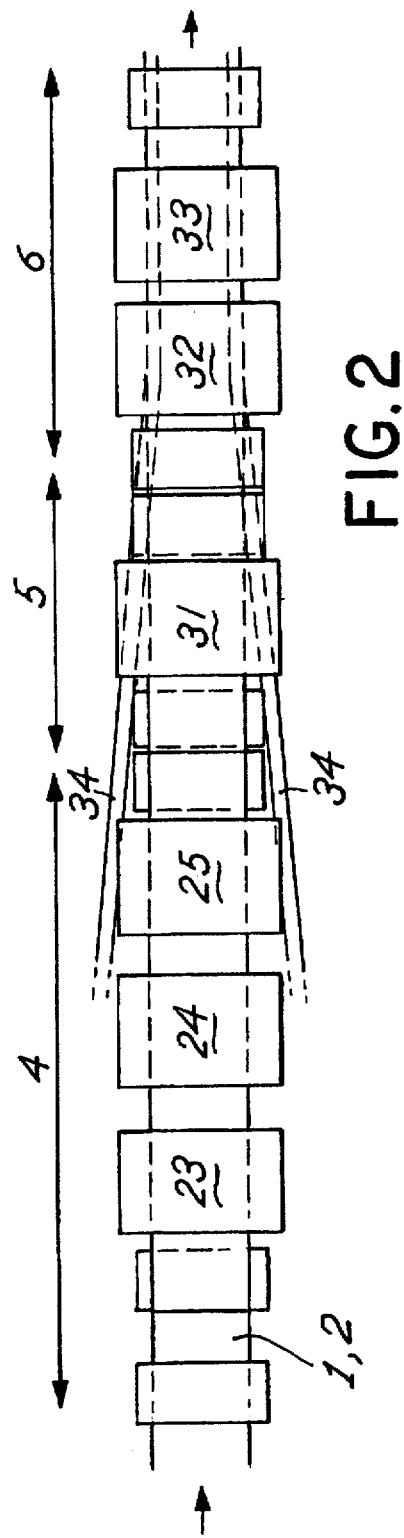
FIG. 2 is a schematic top view of the apparatus of FIG. 1.

FIGS. 1 and 2 schematically show an embodiment of an inventive apparatus for producing bags. The purpose of this apparatus lies in forming foils of a suitable material into a bag with a spout. In the embodiment shown here a composite plastic foil of polyester and polyethylene with a thickness of approximately 100 to 200 micrometers is processed. One of the composite layers of the foil has a lower melting point than the other such that the foil is suited for thermal processing in conventional manner. It is obvious, however, that the apparatus is also suited for processing other kind of foils, such as monofoils.

As in known solutions, processing departs from a wide foil web, which is cut along its middle in a not shown part of the apparatus, such that two individual foil webs are created. The two foil webs are then oriented such that their sides with lower melting point are facing each other. A corresponding device for cutting and orienting the foil webs is e.g. disclosed in EP-A-541 821 and shall not be further described herein.

Foil webs 1, 2 prepared in this way are fed from the left into the apparatus according to FIGS. 1 and 2. They pass three processing areas 4, 5, 6 and leave the shown part of the apparatus as nearly completed bags, which consecutively must be welded at their edge areas and be separated from each other. FIG. 3 shows the foil webs upon leaving the apparatus shown in FIG. 1. Welding the outer edges and separating the bags leads to a product as shown in FIGS. 4 or 5. The bag shown here is e.g. a bag having two side foils, which are welded to each other in lateral areas 7 and to a bottom foil in a bottom area 8. An upper edge area 9 remains unwelded. This area serves as a filling opening and is only closed after the bag has been filled. In a corner region of the bag a spout is provided.

In FIG. 3 two rows of bags are arranged side by side for simultaneous treatment. It is, however, also possible to arrange more that two rows of bags side by side or to work with one row only.

The spout according to FIG. 4 consists of a plastic tube 10. An inner end 10a of the tube extends into the interior 11 of the bag. The center region 10b of the tube is welded tightly to the two foil webs. The outer end 10c extends outwardly over the edge of the bag and is e.g. closed at its outer end or provided with a closing cap (not shown).

In FIG. 4 tube 10 is arranged in the cut-off corner of the bag. It is, however, also possible to arrange the tube in another edge or bottom area thereof.

The embodiment of the bag shown in FIG. 5 has the same basic structure. However, tube 10 of this bag does not extend over the outer edge of the bag. Rather, the edge area 7 of the bag runs around the outer end of the tube and closes it. For opening the bag, the corresponding edge part 12 is cut or torn off.

The shown bags can furthermore possess a depression 13 in an area at the inner end of tube 10 that ensures an unobstructed drainage of the contents. Bags of this kind are e.g. described in EP-A-515 896.

In the following, the workings of the apparatus according to FIGS. 1 and 2 shall first be described in general and then in detail. Hereby it is assumed that the apparatus is set up to produce a bag according to FIG. 4.

As it has been mentioned before, the foil webs 1, 2 enter the apparatus from the left side. They can run through the apparatus continuously. In the embodiment shown here they are, however, moved intermittently in working cycles, such that each foil section remains stationary for a short moment in each working station and is then moved to the next station. The apparatus shown here works with approximately 40 to 60 cycles per minute.

In a first processing area 4 the foil webs 1, 2 run through a driving pair of rollers 20, 21, pass a deviating roller 22 and three processing stations. These processing stations are a heater 23, a pre-former 24 and a pre-cutter 25.

In the heater 23 parts of the foils are locally heated by means of heating stamps, which are pressed from both sides onto the pair of foil webs. The parts heated in this way are deformed in the pre-former 24. The preformer is further described below. Heater 23 as well as pre-former 24 can be omitted if pre-forming the foils is not required.

In the pre-cutter 25 triangular areas 14 (see FIG. 3) are cut out from the center of the two foil webs. For this purpose, a suitable shaped contour knife is punched through both foils.

Since the two foil webs 1, 2 lie against each other in the first processing area 4, processing stations 23, 24 and 25 can process both foil webs simultaneously. This simplifies the apparatus in this area.

Now the foil webs are ready for receiving tube 10. For this purpose, they are separated from each other and led parallel but at a distance through the second processing area 5. The lower foil web 1 is hereby guided by rollers 26 and 27, the upper foil web 2 by rollers 28 and 29. The paths that the two foil webs are covering separately have equal length, such that at the end of the second processing area 5 corresponding parts of the webs lie again accurately on top of each other. For fine-adjustment of the path length, one roller, e.g. roller 28, can be adjustable in position as it is shown by the double arrow 30.

As can be seen from FIG. 1, foil webs 1, 2 are at a higher level in the first processing area 4 than in the third processing area 6. This non-symmetric arrangement has the advantage that lower foil 1 is on a convenient, standard working height in the second processing area and both foils 1, 2 are at this working height in the third processing area.

In the second processing area 5 the foil webs pass an insertion device 31. This insertion device places the tube 10 on lower foil 1 and attaches it there. The design of the insertion device 31 is described in more detail below.

Since the foils 1, 2 are guided separately at a distance from each other in the second processing area 5, there is sufficient space in this area to arrange the whole insertion device between the foils such that it is therefore close to a position where the tubes are attached to the foil. Therefore, the length of the path that must be covered by the tubes in one working cycle is reduced. This allows a simpler and faster tube movement.

At the end of the second processing area 5 foil webs 1, 2 are led back together, such that they again lie on top of each other. At the same time a bottom ribbon 34 folded along its length is introduced between the foil webs 1, 2 from the both sides. The bottom ribbons 34 end up lying between the outer edges of the foil webs 1, 2 with their folded edges pointing inwardly.

In the third processing area 6 foil webs 1, 2 pass a welding device 32 and a cooler device 33. The welding device 32 welds the two foil webs in an area 15 of the tube 10 to each other and to the tube. In the cooler device the areas heated during welding are cooled.

In the following, the pre-former 24 and the insertion device 31 are described in more detail.

Figure 6:
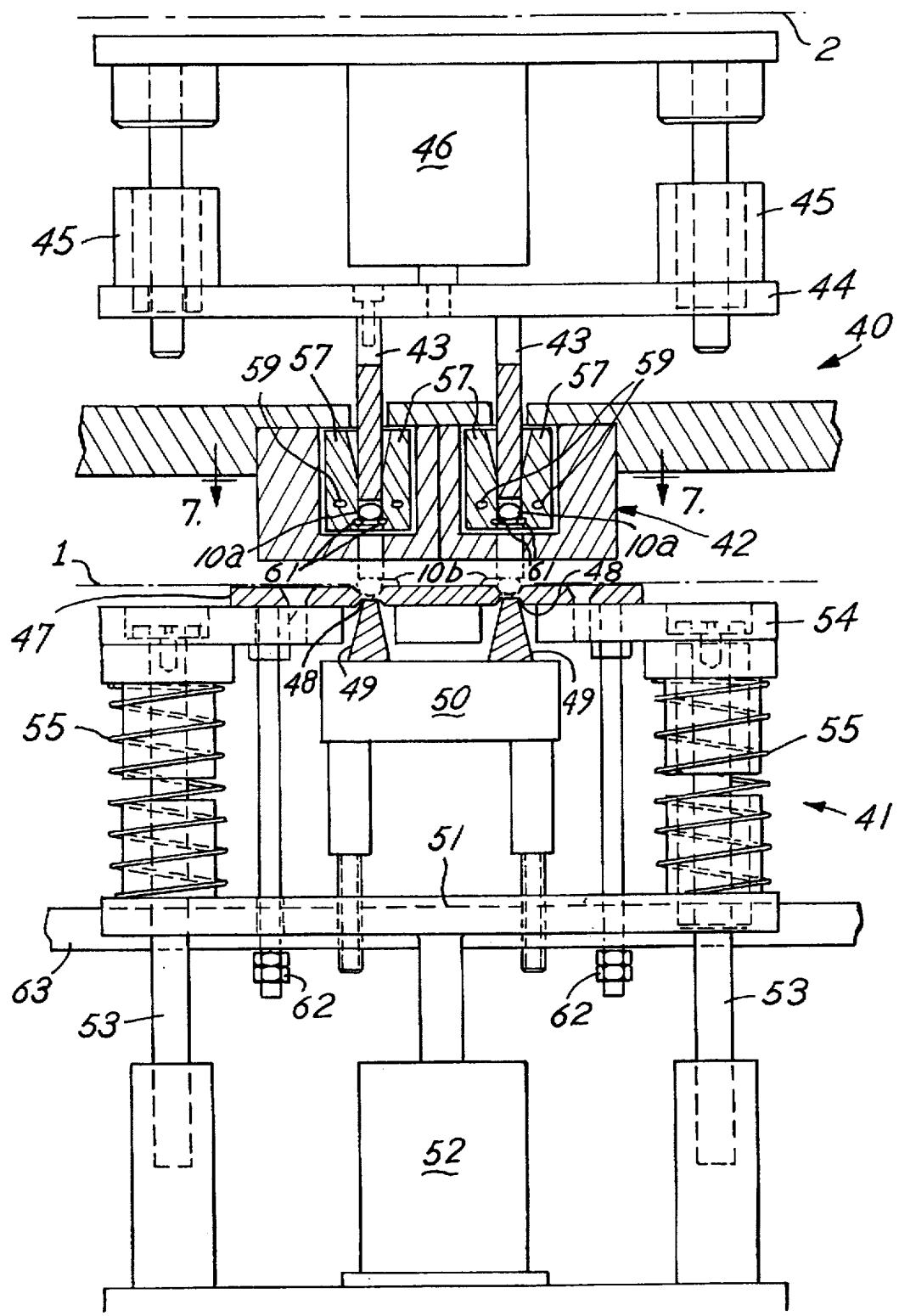
FIG. 6 is a section through the insertion device along line VI—VI of FIG. 1.
Figure 7:
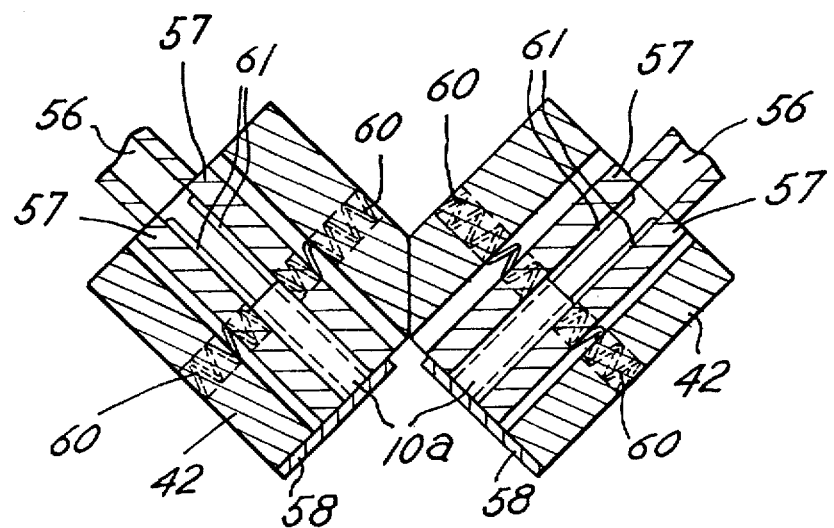
FIG. 7 is a section along line VII—VII of FIG. 6.

The set-up of the insertion device 31 can be seen in FIGS. 6 and 7. A main part 40 of the insertion device is arranged between foil webs 1 and 2. An auxiliary part 41 is arranged below foil web 1.

Main part 40 comprises a holder 42 for receiving the tubes in positions 10a. An ejection mechanism comprising two ejection rods 43 mounted on a plate 44 is arranged above holder 42. Plate 44 is vertically slideable on bearings 45 and can be moved by means of a pneumatic cylinder 46.

Holder 42 comprises two stations 10a for receiving the tubes 10, which, when seen from above, are arranged under a mutual angle of approximately 90° (FIG. 7). This angle is given by the mutual position of the tubes of two neighboring bags (see FIG. 3). The tubes are fed through feeding lines 56 and held between two jaws 57. Their axial position is defined by stop plates 58. The jaws can be tilted around horizontal axes 59 and are compressed at their lower ends by means of springs 60. Each jaw 57 forms a horizontal edge 61 in the lower section of its inner wall.

Auxiliary part 41 below foil web 1 comprises a guiding plate 47 with two openings 48. Two heating fingers 49 heated by a heating element 50 are arranged in the area of these openings 48. Heating element 50 is mounted to a mounting plate 51 which can be moved in vertical direction by means if a pneumatic cylinder 52. Plate 51 is guided by means of two guide rods 53.

Guiding plate 47 rests on a second mounting plate 54, which is also vertically adjustably held by guide rods 53 and further connected to the lower mounting plate 51 by means of springs 55.

The maximum height of the second mounting plate 54 or the guiding plate 47, respectively, is limited by two threaded rods with stop nuts 62, which abut on a stationary plate 63 as soon as the guiding plate 47 reaches its maximum height.

The operation of the insertion device is as follows:

First, two tubes are simultaneously fed to positions 10a. They are held by jaws 57 and their ledges 61. Then, ejection rods 43 are lowered from above onto the tubes and press these against the retention force of the springs 60 out of the holder and into positions 10b. As soon as position 10a is free, the next tubes follow up.

Simultaneously or shortly before the pneumatic cylinder 52 is operated and lifts mounting plate 51 and therefore heating fingers 49 and guiding plate 47 against the lower side of foil web 1. As soon as guiding plate 47 reaches its predefined position, further vertical movement is obstructed by the stopping nuts 62. The heating fingers 49 are moved up a bit further.

Thereby, the tubes are first positioned by the guiding plate 47 and its openings 48, respectively. Then heating fingers 49 come into contact with the foil and weld it to the tubes.

At the end of the working cycle ejection rods 43 are withdrawn and mounting plate 51 is lowered. In this way foil web 1 comes free and can be moved on.

Figure 8:
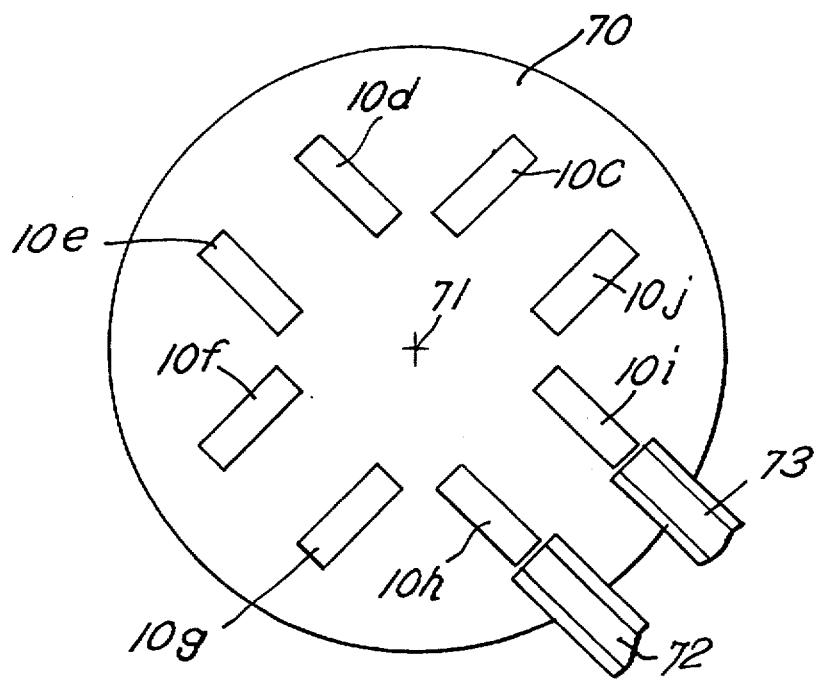
FIG. 8 shows an alternative possibility for feeding the tubes to the insertion device.

FIG. 8 schematically shows a second possibility for feeding the tubes to the insertion device. Here a rotating plate 70 is used, which can by turned about a vertical axis 71. Rotating plate 70 replaces holder 42. In contrast to holder 42, where only two positions for receiving the tubes are provided, rotating plate 70 comprises eight positions 10c–10j with corresponding holding jaws (not shown) for the tubes. Positions 10c and 10d correspond to positions 10a of FIG. 6. From here, the tubes can by ejected downwardly by means of ejection rods 43.

New tubes are fed to positions 10h and 10h, e.g. by means of an industrial robot using a feeding system 72, 73. Since the rotating plate is rotated by 90° in each working cycle, the tubes thus arrive at the ejection positions 10c and 10d after two or three working cycles, respectively (assuming counter-clockwise rotation).

The advantage of the embodiment of FIG. 8 lies in the fact that a full working cycle can be used for introducing the tubes into the insertion device.

Figure 9:
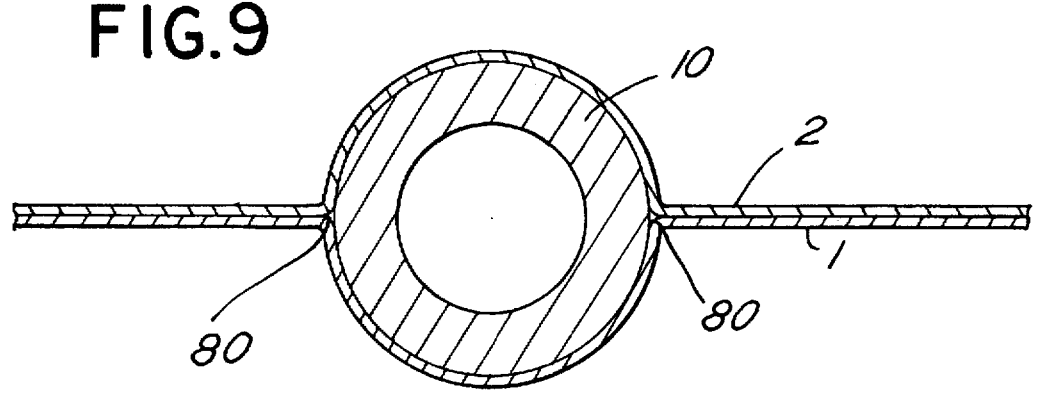
FIG. 9 is a cross section through a bag with a tube with round cross section.

As it has been mentioned above, a pre-former 24 with a heater 23 can be provided in the first processing area 4. These devices can be used for pre-forming the part of the foil where the tube is to be inserted. In such a preforming step it is possible to produce the depression 13 (FIGS. 4, 5). Depending on the used foil material and tube profile, it can also be advantageous to pre-stretch the foil such that it follows the surface of the tube to be inserted, which reduces folds in the foil and improves the tightness of the seal. This can especially be seen in FIG. 9. This figure shows a cross section through a round tube enclosed between the foils. Especially in the points 80 it is difficult to reach a good connection between tube 10 and foils 1, 2, since the foil material must be stretched considerably in this area. By pre-forming or pre-stretching, respectively, the foil material, this problem is reduced.

Figure 10:
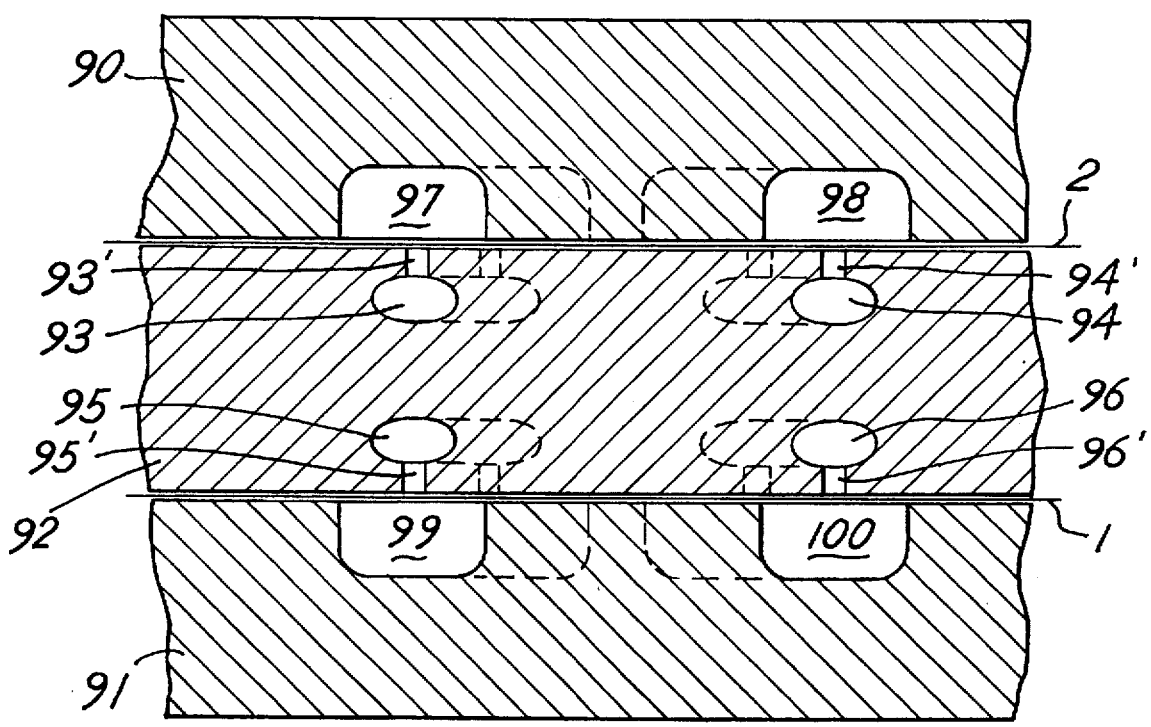
FIG. 10 is a cross section through the preformer.
Figure 11:
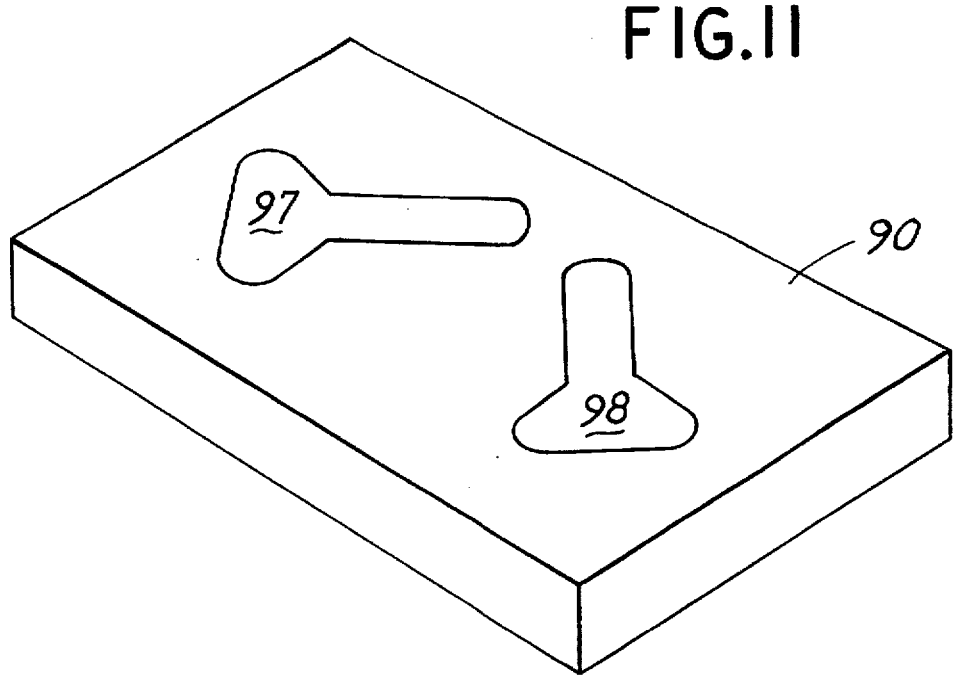
FIG. 11 is a view of a molding plate of the pre-former.

Therefore, an optional pre-former 24 is provided in the apparatus of FIGS. 1 and 2. This pre-former is shown in FIGS. 10 and 11.

The pre-former comprises two molding plates 90, 91 arranged on both sides of a plate 92 with compressed air channels 93–96. Foil webs 1 and 2 run between the molding plates 90, 91 and the plate 92.

The molding plates 90, 91 are metal plates having suitably shaped recesses 97–100.

For pre-forming, foil webs 1, 2 are first heated in station 23 in the areas to be deformed. Then they are advanced to pre-former 24, where they are compressed between the vertically movable molding plates 90, 91 and the plate 92. Then compressed air is fed through channels 93–96, which exits through openings 93'–96' and urges the foil into the recesses 97–100. Thereby, the foil material is stretched as desired.

It has been found that it is difficult to choose a suitable pressure for stretching. This is due to the fact that the two foils have different stretching properties, which are even dependent on direction. Therefore it is advisable that separated regulation valves for air pressure are provided for each channel 93–96. In this way pressure can be adjusted for each depression individually.

Figure 12:
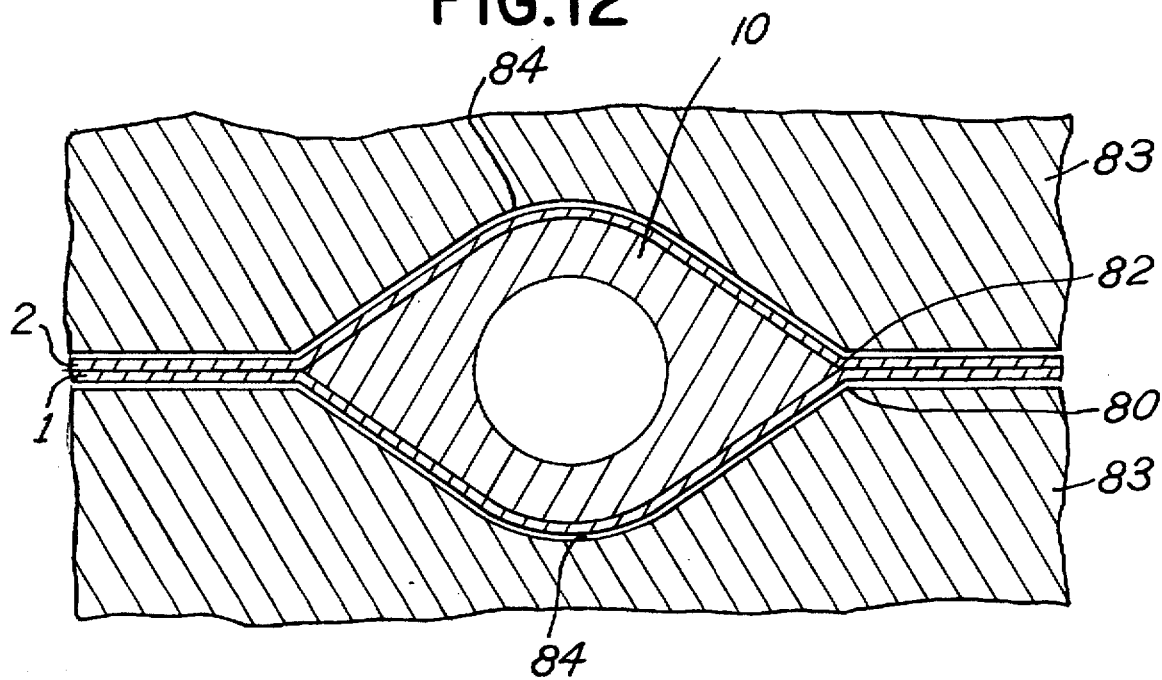
FIG. 12 shows a section through a bag during welding with a tube having lens-shaped cross section.

As it has been mentioned above, depending on foil material and tube cross section pre-forming-of the foils may not be necessary, such as it is shown in FIG. 12. The outer side of the tube 10 shown here tapers into two lateral edges 82, which avoids excessive stretching of the foils in the area 80 and allows a tight connection between foils 1, 2 and tube 10.

The tubes and the foils are welded to each other in welding device 32. As shown in FIG. 12, two welding jaws 83 are thereby pressed onto foil webs 1,2 from both sides. The welding jaws comprise recesses 84 matched to the outer shape form of the tube 10.

Preferably, welding occurs in two steps, in each of which the bags are welded by identical welding jaws. In this way, twice as much time is available for feeding the welding heat, which allows an increase of the machine cycle.

The apparatus shown in FIG. 1 can be modified in many points. As it has been mentioned before, it may e.g. be possible to dispense with the pre-heater 23 and the pre-former 24. The pre-cutter can also be omitted, especially if the tube is not to overlap the edge of the bag, such as it is shown in FIG. 5.

If none of the stations 23–25 is required, the first processing area 4 can be omitted. In this case foil webs 1 and 2 need not be joined before entering second processing area 5.

The use of the pre-former 24 shown in FIG. 10 is not limited to an apparatus as shown in FIG. 1. The pre-former in which the pressure in the area of each depression is adjusted individually can be used wherever several depressions are to be formed in one or more foils. As mentioned the device is especially useful if the depressions have different shape or orientation and/or the stretching properties of the foil(s) are anisotropic or inhomogeneous.

The insertion device 31 is also suited for being used in various production methods and is not limited to being used in the apparatus of FIG. 1.

We claim:

1. A method for producing bags with at least two foil webs and a duct means arranged in an edge region of said bag for providing a duct between said foil webs from an interior of said bag to a spout, said method comprising the steps of:
   guiding said foil webs on top of each other in a first processing area,
   guiding said foil webs at a distance from each other in a second processing area, wherein a region between said foil webs is freely accessible and a tube for forming said duct means is inserted between said foil webs and attached in a predefined position to one of said foil webs,
   guiding said foil webs on top of each other in a third processing area and welding said two foil webs to each other and to said tube in said edge region for forming said bag.

2. The method of claim 1 further comprising the step of pre-forming said webs by stretching said webs in said first processing area for receiving said tube.

3. The method of claim 2 wherein a plurality of depressions are pre-formed by pressing the respective foil web with a given pressure against a contoured surface, and wherein said pressure is set individually for at least a part of said depressions.

4. The method of claim 2 wherein said foil webs are first pre-formed and then pre-cut in said first processing area.

5. A method for producing bags with at least two foil webs and a duct means arranged in an edge region of said bag for providing a duct between said foil webs from an interior of said bag to a spout, said method comprising the steps of
   guiding said foil webs on top of each other in a first processing area and pre-forming a plurality of depressions in at least one of said foil webs for receiving said duct means,
   guiding said foil webs at a distance from each other in a second processing area, wherein a region between said foil webs is freely accessible and a tube for forming said duct means is inserted between said foil webs,
   guiding said foil webs on top of each other in a third processing area and welding said two foil webs to each other and to said tube in said edge region for forming said bag, wherein said depressions are formed by pressing the respective foil web with a given pressure against a contoured surface and wherein the pressure is set individually for at least part of said depressions.

6. A method for producing bags with at least two foil webs and a duct means arranged in an edge region of each bag for providing a duct between an interior of said bag and a spout, said method comprising the steps of:

guiding said foil webs on top of each other in a first processing area, guiding said foil webs at a distance from each other in a second processing area, wherein a region between said foil webs is freely accessible and a tube for forming said duct means is inserted between said foil webs, with a tube for each bag to be formed, and with the bags to be formed arranged in two rows with the edge regions of the bags in each row adjacent one another, guiding said foil webs on top of each other in a third processing area and connecting said foil webs in said edge region of said bags for forming two rows of bags lying beside each other on said webs, wherein, the duct means of slid rows of bags are arranged adjacent to each other in a center of said webs.

7. An apparatus for making bags by adjoining at least two foil webs and by connecting said webs in an edge region, wherein a duct means is arranged in said edge region for providing a duct between an interior of said bag and a spout, said apparatus comprising a first processing area where said webs lie on top of each other, a second processing area where said webs are guided at a distance from each other, a third processing area where said webs again lie on top of each other, means for guiding said webs through said first, second and third processing areas, an insertion device arranged in said second processing area for inserting tubes into an area between said webs and attaching the tubes to one of said webs, and a first welding device arranged in said third processing area for welding said two webs to each other and to said tube in said edge region.

8. The apparatus of claim 7 wherein said insertion device comprises a pressing means for pressing said tube against an inner side of a first of said webs.

9. The apparatus of claim 8 comprising a second welding device arranged on a outer side of said first web being opposite to said pressing means.

10. The apparatus of claim 9 wherein a positioning means is arranged at said outer side of said first web for positioning said tube pressed against said inner side of said first web.

11. The apparatus of claim 10 wherein said positioning means is movable perpendicularly to said outer side of said first web and comprises recesses for positioning said tube pressed against said inner side of said first web.

12. The apparatus of claim 8 wherein said pressing means is constructed and arranged for pressing two tubes simultaneously against said first web.

13. An apparatus for making bags by adjoining at least two webs and by connecting said webs in an edge region, wherein a duct means is arranged in said edge region for providing a duct between an interior of said bag and a spout, said apparatus comprising a first processing area where said webs lie on top of each other, a second processing area where said webs are guided at a distance from each other, a third processing area where said webs again lie on top of each other, means for leading said webs through said first, second and third processing areas, an insertion device arranged in said second processing area for inserting tubes into an area between said webs, and a pre-former arranged in said first processing area for deforming at least one of said webs, wherein said pre-former comprises a plurality of recesses and a pressure source for pressing at least one of said webs into said recesses for forming a plurality of depressions, said pressure source comprising at least two independent pressure regulating means for individually setting a pressure for said depressions.

14. The apparatus of claim 13 wherein one pressure regulator means is provided for each depression for setting the pressure in the depression.

15. An apparatus for making bags by adjoining at least two webs and by connecting said webs in an edge region, wherein a duct means is arranged in said edge region for providing a duct between an interior of said bag and a spout, said apparatus comprising a first processing area where said webs lie on top of each other, a second processing area where said webs are guided at a distance from each other, a third processing area where said webs again lie on top of each other, means for guiding said webs through said first, second and third processing areas, an insertion device arranged in said second processing area for inserting tubes into an area between said webs, and a pre-former arranged in said first processing area for deforming both said webs, wherein said pre-former comprises a pressure generating plate arranged between said webs as well as molding parts arranged on both sides of said pressure generating plate on outer sides of said webs.

16. A method for producing bags with at least two foil webs and a duct means arranged in an edge region of said bag for providing a duct between said foil webs from an interior of said bag to a spout, said method comprising the steps of pre-forming a plurality of depressions in at least one of said foil webs for receiving said duct means, inserting a tube for forming said duct means between said foil webs, welding said two foil webs to each other and to said tube in said edge region for forming said bag, wherein said depressions are formed by pressing the respective foil web with a given pressure against a contoured surface and wherein the pressure is set individually for at least part of said depressions.

17. An apparatus for making bags by adjoining at least two webs and by connecting said webs in an edge region, wherein a duct means is arranged in said edge region for providing a duct between an interior of said bag and a spout, said apparatus comprising a pre-former for deforming at least one of said webs, wherein said pre-former comprises a plurality of recesses and a pressure source for pressing at least one of said webs into said recesses for forming a plurality of depressions, said pressure source comprising at least two independent pressure regulating means for individually setting a pressure for said depressions, an insertion device for placing tubes in said depressions between said webs, and a welding device for welding said two webs to each other and to said tube in said edge region.

* * * * *

UNITED STATES PATENT AND TRADEMARK OFFICE
CERTIFICATE OF CORRECTION

PATENT NO. : 5,788,620
DATED : August 4, 1998
INVENTOR(S) : Rudolph Aeschbach

It is certified that error appears in the above-indentified patent and that said Letters Patent is hereby corrected as shown below:

Column 5, line 11, second occurence, "10h" should read --10i--.

Column 7, line 22 of Claim 6, "slid" should read --said--.

Signed and Sealed this

Twentieth Day of October, 1998

*Attest:*

BRUCE LEHMAN

*Attesting Officer*  *Commissioner of Patents and Trademarks*